March 29, 1960 G. V. FRUSHOUR ET AL 2,930,494
ARTICLE SUPPORTING DEVICE
Filed Feb. 28, 1957
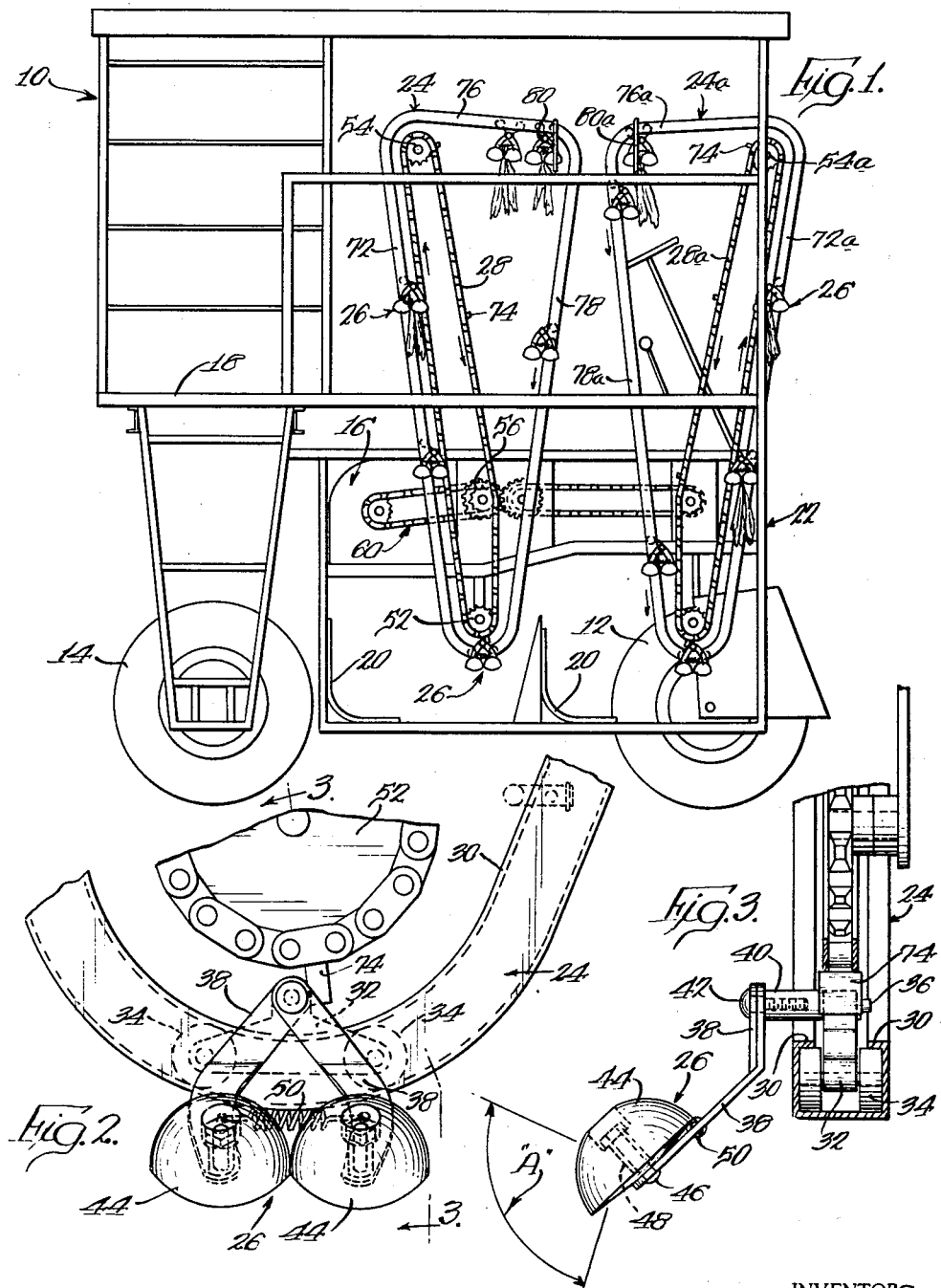
INVENTORS.
George V. Frushour
Donald R. Clinger
BY
Soans, Anderson, Luedeka & Fitch
Attys.

United States Patent Office 2,930,494
Patented Mar. 29, 1960

2,930,494

ARTICLE SUPPORTING DEVICE

George V. Frushour, Fort Atkinson, Wis., and Donald R. Olinger, Burlington, Iowa, assignors to J. I. Case Company, Racine, Wis., a corporation of Wisconsin Application February 28, 1957, Serial No. 643,053

5 Claims. (Cl. 214—5.5)

The present invention relates generally to an article supporting device and is particularly directed to an improved form of conveyor clip for use with an endless conveyor on a tobacco harvester.

Various machines have been designed for the harvesting of tobacco, wherein the "croppers" or pickers, who take the tobacco leaves from the growing plants, are disposed at a lower level on the harvester and the "loopers" who bundle the leaves for storage are supported at an upper level on the machine. The picked tobacco leaves are transported from the lower level to the upper level on the harvester by a conveyor mechanism which passes between the two levels. Usually, this conveyor mechanism is of the endless chain type which is driven from a power-take-off on the harvester engine and runs continuously during the operation of the harvester.

An important portion of the tobacco harvesting means is the device used for supporting the tobacco leaves on the conveyor. The ease with which such devices may be loaded and unloaded greatly effects the efficiency of the entire harvesting procedure. Furthermore, it is very important that the tobacco be handled without damaging it. This invention is particularly directed to a novel and advantageous means for supporting the tobacco in its travel on a conveyor extending from the cropper's station on the harvester upwardly to the looper's elevated position on the machine.

The primary object of the present invention is to provide an improved form of article supporting device for use with a conveyor mechanism. A further object is to provide an improved conveyor clip, which affords releasable engagement with an article being presented thereto throughout a wide range of directions of movement of the article into engagement with the clip. Still another object of this invention is to provide a conveyor clip which is particularly adapted for use with a vertically moving conveyor for a tobacco harvester, and which affords releasable engagement with the stem of a tobacco leaf or the like in a manner expediting the loading and unloading of the tobacco with respect to the conveyor without damaging the tobacco.

Additional objects and advantages will be noted in the accompanying description of the selected embodiment of this invention.

In the drawings:

Figure 1 is a side view of a tobacco harvester embodying the principles of the invention;

Figure 2 is an enlarged, fragmentary view of the harvester conveyor, particularly illustrating the novel conveyor clips; and Figure 3 is a sectional view taken along the line 3—3 in Figure 2.

Although the principles of this invention are of broader application, the invention is particularly adapted for use with a vertically moving conveyor on a tobacco harvester and will be described with respect to such use.

In the conveying of tobacco leaves from the cropper's position adjacent the growing plant to the looper's station on an elevated platform on the harvester, it is essential that the leaves be handled without damaging them. Then too, it is very important to the efficiency of the harvesting operation that the cropper or picker be able to load the conveyor easily and quickly and, also, that the looper be able to easily remove the tobacco leaves from the conveyor without damaging the tobacco or the conveyor. Proper handling of the tobacco, in transporting it between the two stations on the harvester, is provided for in the present invention by a novel form of article-supporting clip for the conveyor. Generally, this clip comprises a pair of yieldingly engaging elements having curved outer surface portions and being rotatably mounted, so that these elements afford engagement with an article, such as the stem of a tobacco leaf, at any of a plurality of directions of movement of the article into position between the spring biased elements.

As seen particularly in Figure 1, the apparatus chosen to illustrate the invention comprises a mobile tobacco harvester 10 having a dirigible front wheel 12, a pair of rear driving wheels 14, and an engine 16 disposed intermediate the front and rear wheels and drivingly connected with the rear wheels. At a position above the harvester wheels, there is provided a platform 18 upon which the loopers stand in order to bundle the tobacco leaves, as by placing the tobacco leaves on sticks or the like in preparation for storage and curing of the tobacco. Below the level of the platform 18 and adjacent the ground level, there is provided one or more seats 20 for supporting the croppers who pick the tobacco leaves from the growing plants. The seats 20 are supported on a frame portion, indicated generally at 22, which is suitably supported on the main frame of the harvester. Preferably, there is provided a frame structure 22 at each of the opposite sides of the harvester, in order that two or more rows of tobacco may be harvested at the same time.

Due to the high clearance required for the harvester, as evidenced by the elevated position of the platform 18, it is necessary to provide some means for conveying the picked tobacco leaves from the position of the croppers on the seats 20 to the upper level on the harvester adjacent the position of the loopers who stand on the platform 18. In the illustrated machine, the conveying means provided for this purpose comprises generally a pair of guide means 24 and 24a adapted to slidably receive a plurality of clips or supporting elements 26, and a pair of endless conveyor chains 28 and 28a. Each of the guide means has its lower end disposed immediately forward of one of the cropper seats 20, and the guide means extend upwardly to a position within easy reach of a looper standing on the platform 18.

The guide means 24 and 24a each consists of a generally channel-shaped, elongated member which is formed to provide a continuous track portion having a generally triangular path. As noted in Figures 2 and 3, the flanges of the channel-shaped guide members extend inwardly of the path formed by such member, and these flanges terminate in inwardly turned edge portions 30. These edges 30 serve to slidably retain a plurality of the conveyor clips 26 within each of the tracks 24 and 24a. Since the guide means 24 and 24a are generally alike, the remainder of the description will be with respect to one of the tracks, namely 24.

The conveyor clip assembly 26, which is the subject matter of this invention, includes a main supporting part or rider 32, which is disposed in the track or guide 24 between the flange edges 30. The part 32 is provided at each of the opposite ends thereof with a pair of rollers 34, which afford free rolling movement of the conveyor clip relative to the guide means. A portion of the rider 32 extends outside of the track 24 and has pivotally mounted thereon, as by a pin 36, a pair of arms 38 which are maintained in spaced relation to the side of the guide means 24 by an enlarged shoulder portion 40 of the pivot pin 36. The arms are held in place on the pivot pin 36 by a screw 42. The free ends of the arms 38 are preferably formed and arranged to converge toward each other, and each of these arms has supported thereon a generally hemi-spherical part in the form of a roller 44. The roller 44 is rotatably mounted on the arm 38 for movement about a central axis, as by means of a bolt 46 and a cylindrical bearing or spacer 48. The two rollers 44 are biased into engagement with each other by means of a coil tension spring 50 which extends between the outer ends of the arms 38 and which is fixed at its opposite ends to each of the arms.

The conveyor clips 26 are propelled through a selected portion of the path of the guide means 24, in order to elevate the picked tobacco to a position above the platform 18, by means including the conveyor chain 28 (Figure 1) which is disposed around sprockets 52 and 54, positioned adjacent the lower and upper level, respectively, of the guide means 24, and including a drive sprocket 56. A similar arrangement is provided for the conveyor chain 28a, and the two conveyor chains are suitably driven in unison by a power take-off on the harvester engine and through the chain and sprocket drive means indicated at 60.

In the illustrated embodiment, the conveyor chain 28 associated with the rearwardly disposed guide means or track 24 is positioned so that one run thereof extends adjacent the rearwardmost side 72 of the guide means 24. The conveyor chain 28a for the forward guide means 24a has one run thereof disposed adjacent the forward side section 72a of the guide means 24a. Each conveyor chain includes a number of spaced-apart projections or pusher elements 74 (Figures 2 and 3) which are fixed thereon in position for engagement with the portion of the rider 32 on each of the conveyor clips 26 which extends outwardly from the tracks 24 and 24a. It will be noted, therefore, that as this projecting element 74 engages a conveyor clip disposed at the lower section of the guide means (Figure 2) the conveyor chain will positively move the clip upwardly to the top of the guide means. The projecting element 74 on the chain will become disengaged from the conveyor clip as the latter moves on to the upper section 76 (Figure 1) of the guide means.

The upper sections 76 and 76a of the guide means 24 and 24a, respectively, are inclined slightly downwardly from the side adjacent the associated conveyor chain, and this arrangement permits the conveyor clips to gravitate toward the other side sections 78 and 78a of the respective guide means. There is provided a pair of stops 80 and 80a adjacent the path of the respective guide means, in order to selectively halt the conveyor clips 26 before they are returned to the lower end of the conveyor.

The particular form of the conveyor mechanism described above, apart from the conveyor clips 26, is not a part of the present invention, but is more fully disclosed and claimed in the copending application, Serial No. 643,139, which is also assigned to the assignee of this invention. It will be readily apparent that other forms and types of conveyors may advantageously employ the novel conveyor clips disclosed herein. For example, the conveyor clips 26 may be directly connected to an endless conveyor chain for movement therewith throughout its entire path.

The novel form of conveyor clip which comprises this invention is very advantageous, particularly in connection with the harvesting of tobacco and the like, wherein it is desired to suspend the tobacco leaves by their stems and avoid any damage to the leaves. As noted particularly in Figure 3, the disposition of the curved outer surfaces of the generally hemi-spherical elements or rollers 44 is such that they afford ready insertion of the tobacco leaf stems between the rollers, throughout a very substantial angle "A," at least 90 degrees as illustrated, while affording rotation of the rollers about the central axes provided by the bolts 46. In other words, the cropper or picker may insert the stems of the tobacco leaves between the rollers 44 on the clip by a generally horizontal motion, by a generally vertical motion wherein the stems are pushed upwardly between the rollers, or by any motion intermediate the described lines of motion, and still realize the advantages of the curved surfaces and rotary mounting of the rollers 44. This novel construction and arrangement of the conveyor clip obviates any need for exercising great care in placing the tobacco on the conveyor clips. Furthermore, with the described arrangement, the loopers can similarly unload the conveyor clips with ease and without damaging the leaves or stem by pulling the tobacco away from the clip in any of a number of directions. The most natural manner of unloading and clips is with a downward pull, and the rollers 44 are disposed to facilitate unloading in this manner without damaging either the tobacco or the conveyor clip, as well as affording unloading in any other direction included within the angle "A."

It will also be noted that the conveyor clips 26 are so arranged that the tobacco leaves are supported by their stems, between the arms 38, and disposed in vertically extending position throughout their movement on the conveyor. Thus, the tobacco stems are in position for easy access thereto by the looper, when the tobacco reaches the upper portion of the conveyor and, also, the leaves are protected against any damage during travel on the conveyor.

While shown and described in connection with a particular form of apparatus, it will be apparent that other modifications can be made without departing from the principles of the invention.

We claim:

1. An article supporting means adapted for use with a generally vertically disposed endless conveyor mechanism and movable therewith through a generally vertical plane, said article-supporting means comprising a pair of arms pivotally mounted at one end on said conveyor mechanism for swinging movement generally in the plane of movement of said article-supporting means, said swinging movement of said arms being both relative to one another and relative, as a unit, to said conveyor mechanism, a pair of elements rotatably mounted, respectively, adjacent the free ends of said arms in position for engagement with each other, each of said elements having an outwardly curved surface portion, and biasing means urging said elements into engagement in positions along said curved surface portions whereby the rotatable curved-surface elements afford ready insertion of an article through movement of the article in any of a plurality of directions relative to said curved-surface portions to a position of support rearwardly of the engagement of said curved portions.

2. An article-supporting means adapted for use with a generally vertically disposed endless conveyor mechanism and movable therewith through a generally vertical plane, said article-supporting means comprising a pair of arms pivotally mounted at one end on said conveyor mechanism for vertical swinging movement generally parallel to the plane of movement of said article-supporting means, said swinging movement of said arms being both relative to one another and relative, as a unit, to said conveyor mechanism, a pair of elements rotatably mounted, respectively, adjacent the free ends of said arms in position for engagement with each other, each of said elements having an outwardly facing, generally hemispherical surface portion, and biasing means urging said elements into yielding tangential engagement in positions along said generally hemispherical surface portions whereby the rotatable elements provide an entry angle of at least about 90 degrees for insertion of an article between said surface portions of said elements to a position of support rearwardly of the tangential engagement of said element surface portions.

3. An article-supporting means adapted for use with a generally vertically disposed endless conveyor mechanism and movable therewith through a generally vertical plane, said article-supporting means comprising a pair of arms pivotally mounted at one end on said conveyor mechanism for swinging movement generally parallel to the path of movement of said conveyor mechanism and about a generally horizontal axis, said swinging movement of said arms being both relative to one another and relative, as a unit, to said conveyor mechanism, said pair of arms having their other end portions disposed in outwardly and downwardly inclined relation to the plane of the generally vertical path of movement of said article-supporting means, a pair of generally hemispherical elements rotatably mounted, respectively, adjacent the free ends of said arms with their axes of rotation extending generally perpendicular to the respective arms and with the curved portions facing outwardly of the path of said conveyor mechanism in position for engagement with each other, and a tension spring connecting said arms and urging said elements into yielding tangential engagement along their curved-surface portions whereby there is afforded ready insertion of an article through movement of the article in any of a plurality of directions relative to the curved-surface portions of said elements.

4. In a tobacco harvester having a wheel-supported frame including vertically spaced-apart support means for carrying a plurality of persons at an upper and lower level, respectively, on the frame, and having a generally vertically disposed conveyor mechanism on said frame for transporting tobacco from a position adjacent the support means at the lower level to a position adjacent the upper level on the harvester, an improved article-supporting means for use with said conveyor mechanism in the transporting of tobacco between the lower and upper levels on the harvester, said article-supporting means comprising a pair of arms pivotally mounted at one end on said conveyor mechanism for swinging movement generally in a plane parallel to the plane of movement of said conveyor mechanism, said swinging movement of said arms being both relative to one another and relative, as a unit, to said conveyor mechanism, a pair of elements rotatably mounted, respectively, adjacent the free ends of said arms in position for engagement with each other, each of said elements having an outwardly curved surface portion, and biasing means urging said elements into engagement in positions along said curved-surface portions whereby the rotatable curved-surface elements afford ready insertion of an article through movement of the article in any of a plurality of directions relative to said curved-surface portions to a position of support rearwardly of the engagement of said curved portions.

5. In a tobacco harvester having a wheel-supported frame including vertically spaced-apart support means for carrying a plurality of persons at an upper and lower level, respectively, on the frame, and having a generally vertically extending conveyor mechanism on said frame for transporting tobacco from a position adjacent the support means at the lower level to a position adjacent the upper level on the harvester, an improved clip for use with said conveyor mechanism comprising a pair of arms pivotally mounted at one end on said conveyor mechanism for swinging movement generally in a plane parallel to the plane of movement of said conveyor mechanism, said swinging movement of said arms being both relative to one another and relative, as a unit, to said conveyor mechanism, said pair of arms having their other end portions disposed in outwardly and downwardly inclined relation to the generally vertical path of movement of said conveyor mechanism, a pair of generally hemispherical elements rotatably mounted, respectively, adjacent the free ends of said arms, their axes of rotation extending generally perpendicular to the respective arms and with the curved-surface portions facing outwardly of said conveyor mechanism in position for engagement with each other, and a tension spring connecting said arms and urging said elements into yielding tangential engagement along their curved-surface portions whereby there is afforded ready insertion of an article through movement of the article in any of a plurality of directions relative to the curved-surface portions of said elements to a position of support rearwardly of the tangential engagement of the curved surface portions of said elements.

References Cited in the file of this patent

UNITED STATES PATENTS

| | | |
|---|---|---|
| 1,112,591 | Beem | Oct. 6, 1914 |
| 2,786,585 | Davis et al. | Mar. 26, 1957 |